UNITED STATES PATENT OFFICE.

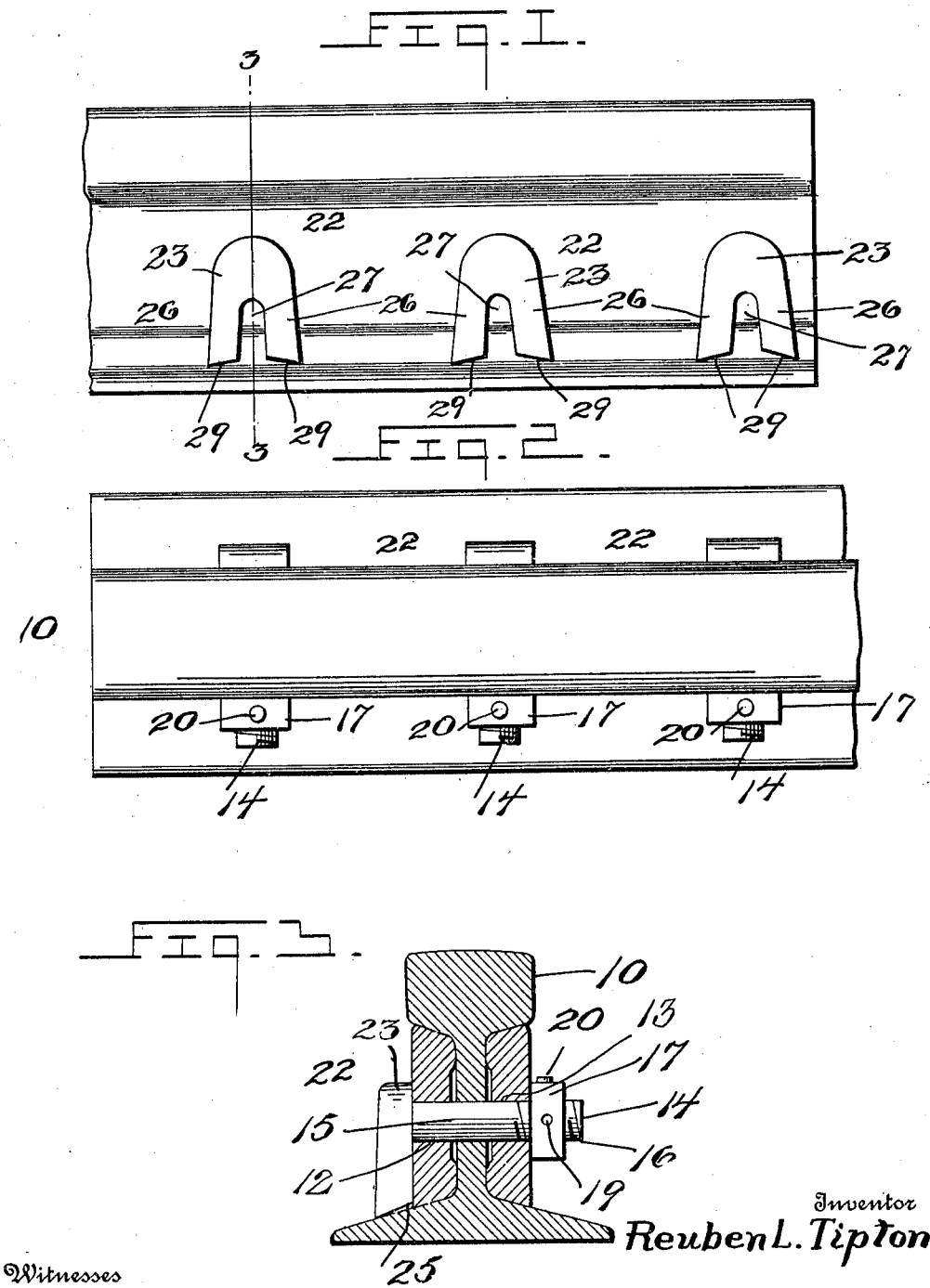

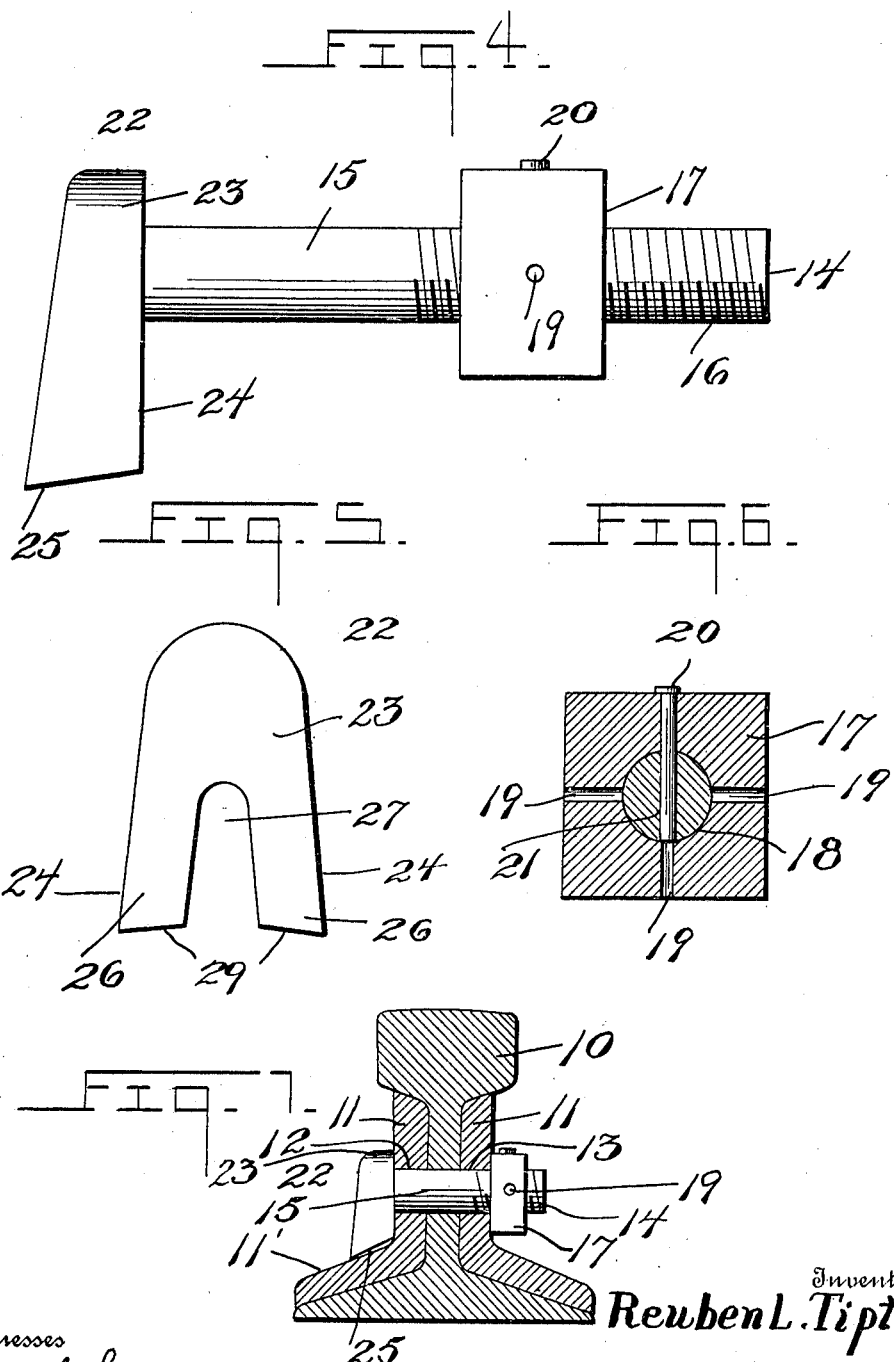

REUBEN L. TIPTON, OF SAFFORD, ALABAMA.

RAILROAD-RAIL BOLT.

978,235.   Specification of Letters Patent.   Patented Dec. 13, 1910.

Application filed June 21, 1910. Serial No. 568,207.

*To all whom it may concern:*

Be it known that I, REUBEN L. TIPTON, a citizen of the United States, residing at Safford, in the county of Dallas and State of Alabama, have invented certain new and useful Improvements in Railroad-Rail Bolts, of which the following is a specification.

This invention relates to improvements in rail joints, and particularly to a bolt used therefor.

One object of the invention is to provide a locking means for the nut, to hold the same from turning.

Another object is to provide a head on the bolt which will prevent the same from turning.

A further object is to provide a bolt having a depending portion provided with biting edges on opposite sides thereof, adapted to engage with the upper face of an angle bar or the upper face of the base member of a rail.

With these and other objects in view, the invention consists in the construction, combination and arrangement of parts as will be more fully hereinafter described and pointed out in the claims, but it will be understood that changes in the specific structure may be made within the scope of the claims without departing from the spirit of the invention.

In the drawings: Figure 1 is a side elevation of a rail joint, showing my invention applied thereto, Fig. 2 is a top plan view of the joint, Fig. 3 is a section on the line 3—3 of Fig. 1, Fig. 4 is an enlarged detail, in side elevation of the bolt, Fig. 5 is an end view of the headed end of the bolt, Fig. 6 is a longitudinal section through the bolt and nut, Fig. 7 is a similar section to Fig. 3, showing the use of the fish plates, and the head engaging the base of the rail.

Referring to the drawings, 10 represents a rail having the angle bars 11 disposed on opposite sides thereof, and having respectively, the openings 12 and 13, through which is adapted to pass my improved bolt 14. The bolt comprises a shank 15 having the ordinary threads 16 at one end thereof, adapted to receive thereon the nut 17. Formed through each face of the nut, and extending into the threaded opening 18 is a passage 19, through which is adapted to be passed a pin 20, and formed vertically through the threaded portion of the shank of the bolt, is an elongated opening 21, which receives therethrough the pin 20 when the nut is adjusted to bring any one of the openings 19 in register therewith. The elongated opening 21 is of slightly less width than the pin 20, so that when the pin is driven through, it will bindingly contact with the sides of said opening, and prevent the backing off of the nut. The bolt is provided with a head 22, having the upper portion 23 in line with the shank thereof, and the depending bifurcated portion 24, the lower faces of which are inclined upwardly and inwardly toward the rail, as at 25, to conform to the inclined surface 11' of the angle bar. The depending portion has the two legs 26, which are of sufficient resiliency to be bent in a direction transversely of the head, so that any tendency of the parts to move which might cause the bolts to turn, would result in the bending of one of the legs and the biting engagement of either of the edges 25 into the surface of the angle bar. Each of the legs 26, has its lower face also inclined upwardly toward the arched opening 27, so that the edges 25, only, engage the surface 11', it being thus seen that it would be impossible for the bolt to turn.

As seen in Fig. 7, the legs of the head of the bolt are shown as contacting with the upper surface 11' of an angle bar.

From the foregoing, it will be apparent that the bolt is effectively prevented turning by its head, and also the nut is prevented backing off. Furthermore, in applying the bolt the same would be driven in to cause the edges 25 to bite into the surface 11', and any longitudinal movement of the bolt, out of the openings in the angle bars and rail, would be effectively prevented by the trihedral angle 29.

What is claimed is:

1. In combination with the meeting ends of a pair of rails and angle bars, of a bolt having a vertically arranged and elongated opening through one end thereof, a nut on said end provided with transversely formed openings adapted to register with said elongated opening and to receive a pin therethrough, said pin adapted to form a binding contact with the side walls of said elongated opening, and a head on said bolt, provided with depending resilient spaced legs having biting edges.

2. In combination with an angle bar of a rail joint, a bolt having a nut on one end, means for locking said nut to said bolt, and a head on the opposite end of said bolt having depending spaced legs, the lower faces of said legs being inclined upwardly and inwardly toward said angle bar, said faces also being upwardly and inwardly inclined toward each other, whereby a biting edge is formed on each of said legs, and which is adapted to bite into the surface of said angle bar.

3. In combination with a rail joint having fish-plates thereon, a bolt having a nut on one end, means for locking said nut to said bolt, and a head on the opposite end of said bolt having depending spaced legs, the lower faces of said legs being inclined upwardly and inwardly toward said angle bar, said faces also being upwardly and inwardly inclined toward each other, whereby a biting edge is formed on each of said legs, and a biting corner formed at the intersection of the inclined edges of the faces, said biting edge and biting corner being adapted to engage into the upper surface of the base of a rail to prevent the movement of the bolt in any direction.

In testimony whereof I affix my signature, in the presence of two witnesses.

REUBEN L. TIPTON.

Witnesses:
W. H. WILLS,
C. A. FISHER.